March 29, 1960     A. G. TULL     2,930,691
PLANOGRAPHIC DYE-ABSORPTIVE FILM AND METHOD OF MAKING SAME
Filed March 28, 1955
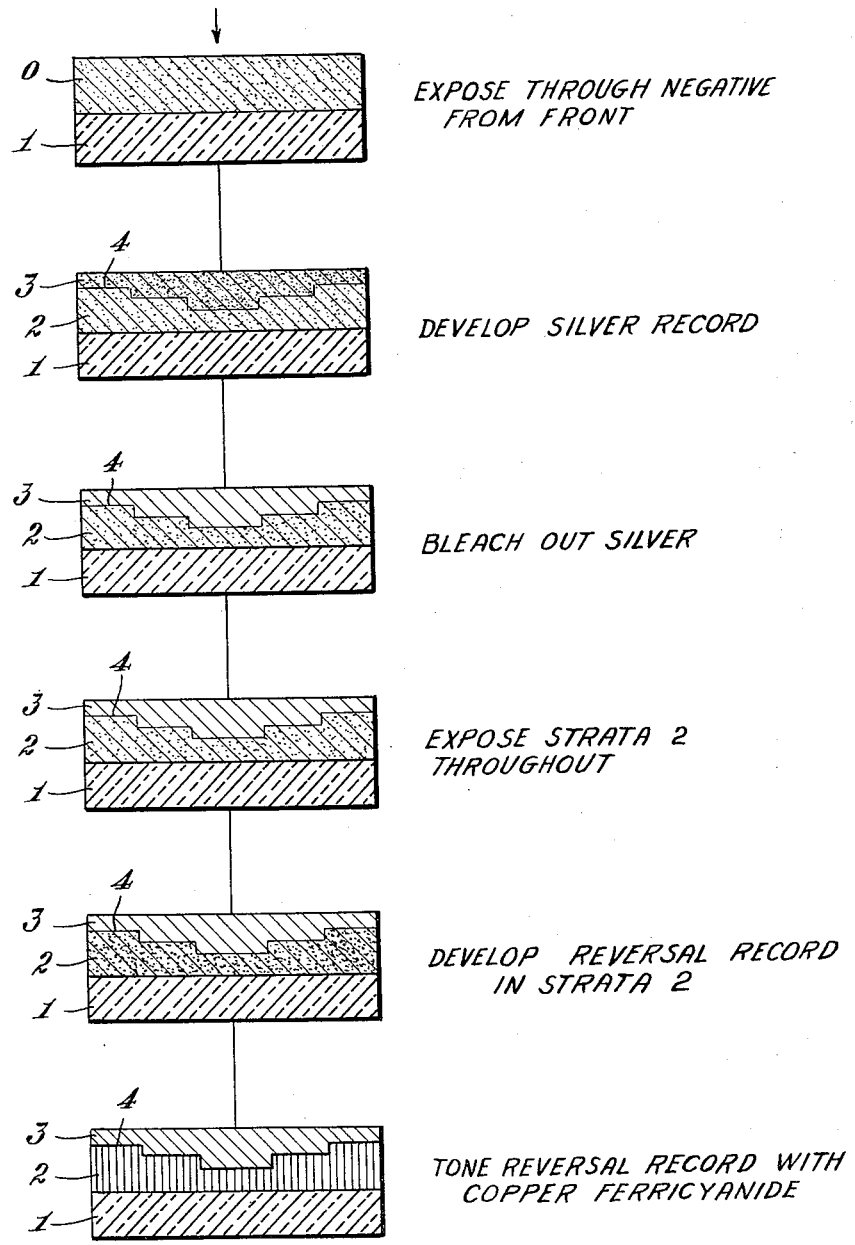
Inventor
Alan G. Tull
by Roberts, Cushman & Grover
Att'ys United States Patent Office 2,930,691
Patented Mar. 29, 1960

2,930,691

PLANOGRAPHIC DYE-ABSORPTIVE FILM AND METHOD OF MAKING SAME

Alan G. Tull, Pinner, England, assignor to Technicolor Corporation, Hollywood, Calif., a corporation of Maine Application March 28, 1955, Serial No. 497,313

6 Claims. (Cl. 96—33)

This invention relates to color pictures formed by dye absorption and more particularly to matrices used in printing pictures by imbibition, that is by transfer of dye from one or more dye-soaked matrices to a dye absorptive layer of gelatin or the like, usually from three matrices representing the three color aspects of a scene and containing cyan, magenta and yellow dyes respectively.

Heretofore imbibition pictures have usually been made with relief matrices in which the shadows and highlights are represented by hills and valleys, but such matrices have inherent disadvantages. It has also been proposed to use various kinds of planographic matrices, that is matrices of uniform thickness, but these have been even less satisfactory than the relief matrices.

Objects of the present invention are to produce a planographic dye-absorptive matrix or other record which is free from the drawbacks of prior matrices, which need not be exposed through the backing which supports the dye-absorptive medium, which therefore avoids flare and other forms of light dispersion characteristic of projection printing through the film base, and which has better definition, which does not tend to emboss the blank to which the dye is transferred, which transfers dye throughout its entire area without non-transfer spots, and which is generally superior to prior dye-absorptive records.

In one aspect the present invention involves the method of making a film for differential dye absorption in accordance with a photographic exposure of a scene which comprises exposing the emulsion of a silver halide film from the front to form a latent image of the scene in the outer stratum of the emulsion, developing the latent image into a silver record, bleaching and removing the silver record, "flashing" or exposing the emulsion to light to form a complemental image of the scene in the originally unexposed inner stratum of the emulsion, developing the complemental image to form a complemental record, and toning the complemental record with metallic ferricyanide to prevent the complemental record from absorbing dye. While the toning may be effected with other ferricyanides such as iron or uranium ferricyanide, it is preferably effected with copper ferricyanide.

In another aspect the invention involves a photographic record comprising a base, a coating of uniform thickness on the base, and in the side of the coating adjacent the base a photographic record toned to prevent it from absorbing dye, the remaining thickness of the coating being dye-absorptive. While the toned record may comprise other metallic ferrocyanides, such as ferric or uranium ferrocyanide, it preferably comprises copper ferrocyanide.

In still another aspect the invention involves a photographic record comprising a base, a coating of uniform thickness on the base, in the side of the coating opposite the base a dye-absorptive record of variable depth and at the boundary between said record and the remainder of the coating a resist which is substantially impermeable to dye, the resist preferably comprising copper ferrocyanide or other metallic ferrocyanide.

By printing the matrix from the front of the matrix surface ultimately coming into contact with the absorptive layer of the blank is that surface which receives the incident light in printing and which therefore has better definition; and by using a planographic matrix the dye transfers throughout the entire area of the matrix without non-transfer spots because the matrix contacts the blank throughout its entire area. While the matrix is preferably printed in a contact printer it may be printed in an optical printer.

For the purpose of illustration a typical embodiment of the invention is illustrated by the accompanying flow chart in which 1 indicates a backing of cellulose nitrate or the like carrying a layer of gelatin O or the like containing inner and outer strata 2 and 3 meeting at a boundary 4. Originally the coating is a light-sensitive silver halide emulsion. In the illustration it is first exposed from the front, that is from the top, to a step wedge having sharp edges, the emulsion being exposed to the line 4. Then the latent image is developed to a silver image and bleached to remove the silver. Then the remaining unexposed portion 2 of the emulsion is exposed to light, developed and toned with copper or other metallic ferricyanide to convert the silver in the portion 2 to ferrocyanide.

The following are specific examples of methods employing Eastman Kodak Matrix Film No. 5516 which is dyed red throughout to limit the penetration of light.

*Example I*

(1) Develop 5-mins. at 65° F.:
   (A) Pyrogallol _____ gms__ 8
       Sodium sulphite anhyd _____ gms__ 160
       Water to 1 litre.
   (B) Sodium carbonate monohydrate ___ gms__ 65.5
       Water to 1 litre.
   For use: 1 part (A)+1 part (B)+2 parts water+1 ml. of 1% 6-nitrobenzimidazole nitrate
(2) Wash 3 mins.
(3) Harden 2 mins. in 5% potash alum solution
(4) Wash 30 secs.
(5) Reversal bleach 4 mins. at 60° F.:
   Potassium dichromate _____ gms__ 5
   Sulphuric acid conc. _____ mls__ 10
   Distilled water to 1 litre.
(6) Wash 1 min.
(7) Clear 2 mins. in 2% sodium sulphite solution.
(8) Wash 5 mins.
(9) Dry
(10) Expose to light and re-develop in first developer 5 mins.
(11) Wash 5 mins.
(12) Dry
(13) Tone for 5 mins. at 65° F.:
   Cupric chloride 30% solution _____ mls__ 133
   Potassium citrate 80% solution _____ mls__ 250
   Sodium chloride 25% solution _____ mls__ 400
   Potassium ferricyanide 25% solution ___ mls__ 80
   Water to 1 litre.
   Mix the bath from the component solutions just before use.
(14) Wash 5 mins.
(15) Dry

*Example II*

(1) Develop 3 minutes in a metol-hydroquinone developer, for example Kodak formula D–72.
(2) Wash 3 mins.
(3) Bleach in:
   Potassium permanganate _____ gms__ 2
   Sulphuric acid conc. _____ mls__ 10
   Water to 1 litre (caution: add acid last).
(4) Wash 1 minute
(5) Clear in 2½ percent sodium bisulphite (6) Wash 5 mins.
(7) Expose to light and re-develop in first developer
(8) Wash 10 minutes
(9) Tone in:

| | |
|---|---|
| Potassium ferricyanide 30% solution | mls 25 |
| Potassium dichromate 1% solution | ml 1 |
| Nitric acid 10% solution | mls 40 |
| Phosphoric acid conc. | mls 2 |
| Ferric nitrate 35% solution | mls 25 |
| Water to 200 mls. | |

(10) Wash 10 mins. and dry.

*Example III*

Instead of using the iron toner at step 9 of Example II, use the following toner:

| | |
|---|---|
| Uranium nitrate | gms 20 |
| Potassium ferricyanide | gms 20 |
| Water to 1 litre. | |

In making imbibition prints with records made as described, well-know acid dyes may be used in the same manner as with ordinary relief matrices. In dyeing the film the dye penetrates only to the line 4, notwithstanding the fact that water alone may pass freely through this boundary into the inner portion 2. Tests with the copper ferricyanide toner indicate that this is due not so much to non-absorptivity of the toned portion 2 as to the fact that the toning process produces a resist at the boundary 4 which obstructs the passage of acid dye while permitting passage of water.

It should be understood that the present disclosure is for the purpose of illustration only and that this invention includes all modifications and equivalents which fall within the scope of the appended claims.

I claim:

1. In making a film which reproduces a scene by differential dye absorption in accordance with a photographic exposure of a scene, the method which comprises exposing from the front an emulsion of a silver halide film containing dye to limit the penetration of light to form a latent image of the scene in an outer stratum of the emulsion leaving an unexposed inner stratum, developing the latent image into a silver record, bleaching and removing the silver record, exposing the emulsion uniformly to light to form a complemental image of the scene in the inner stratum of the emulsion, developing the complemental image to form a complemental record, rendering the complemental record substantially impermeable to dye by toning with metallic ferricyanide chosen from the group consisting of copper, iron and uranium ferricyanide, and absorbing dye into the bleached outer strata of said emulsion.

2. In printing pictures by imbibition, the method which comprises exposing from the front an emulsion of a silver halide film containing dye to limit the penetration of light to form a latent image of the scene in an outer stratum of the emulsion leaving an unexposed inner stratum, developing the latent image into a silver record, bleaching and removing the silver record, exposing the emulsion to uniform light to form a complemental image of the scene in the inner stratum of the emulsion, developing the complemental image to form a complemental record, rendering the complemental record substantially impermeable to dye by toning with metallic ferricyanide chosen from the group consisting of copper, iron and uranium ferricyanide, and applying imbibition dye evenly over the surface of said emulsion to form an image in the outer stratum by absorption of dye therein, and using the dyed film to print pictures by imbibition.

3. A photographic film reproducing a scene by differential dye absorption in accordance with a photographic exposure of a scene, comprising a base, a coating of uniform thickness on the base, a record of the scene in the inner stratum of the coating adjacent the base, said record comprising metallic ferrocyanide which is chosen from the group consisting of copper, iron and uranium ferrocyanide and which is substantially impermeable to dye, and a complemental record of the scene in the outer stratum of the coating, said complemental record comprising absorbed imbibition dye.

4. The method according to claim 1 further characterized in that the ferricyanide is copper ferricyanide.

5. A film according to claim 3 further characterized in that the ferrocyanide is copper ferrocyanide.

6. The method according to claim 2 further characterized in that the ferricyanide is copper ferricyanide.

References Cited in the file of this patent

UNITED STATES PATENTS

| | | |
|---|---|---|
| 923,030 | Donisthorpe | May 22, 1908 |
| 1,278,668 | Ives | Sept. 10, 1918 |
| 2,327,304 | Grant | Aug. 17, 1943 |
| 2,415,626 | Coote | Feb. 11, 1947 |

FOREIGN PATENTS

| | | |
|---|---|---|
| 918,413 | France | Oct. 21, 1946 |

OTHER REFERENCES

Friedman: History of Color Photography, American Photo. Pub. Co., Boston, 1944, pp. 466–467.